(12) United States Patent
Kitamura

(10) Patent No.: US 6,829,594 B1
(45) Date of Patent: Dec. 7, 2004

(54) AUTHORED DATA PROVIDING METHOD, SYSTEM AND COMPUTER-READABLE RECORDING MEDIUM FOR PERFORMING SAID METHOD

(75) Inventor: Yoshiharu Kitamura, Yokohama (JP)

(73) Assignee: RealRead, Inc., New York, NY (US)

( * ) Notice: Subject to any disclaimer, the term of this patent is extended or adjusted under 35 U.S.C. 154(b) by 424 days.

(21) Appl. No.: 09/663,353

(22) Filed: Sep. 15, 2000

Related U.S. Application Data

(63) Continuation-in-part of application No. PCT/JP00/02230, filed on Apr. 6, 2000.

(30) Foreign Application Priority Data

Aug. 27, 1999  (JP) ............................................ 11-241404

(51) Int. Cl.[7] .............................................. G06F 17/60
(52) U.S. Cl. .............................. 705/51; 705/64; 707/10; 709/203
(58) Field of Search ........................ 705/50–59, 63–64, 705/67, 71–77; 380/200–203, 230–234, 239, 241, 277–285, 28–30; 713/155–157, 164–170, 200–202; 707/205, 9–10; 709/200–203

(56) References Cited

U.S. PATENT DOCUMENTS

| | | | | |
|---|---|---|---|---|
| 5,715,403 A | * | 2/1998 | Stefik | ......................... 395/244 |
| 5,765,152 A | * | 6/1998 | Erickson | ........................ 707/9 |
| 5,794,207 A | | 8/1998 | Walker et al. | |
| 5,883,954 A | * | 3/1999 | Ronning | ......................... 500/4 |
| 5,892,900 A | * | 4/1999 | Ginter et al. | ................ 713/200 |
| 5,895,454 A | | 4/1999 | Harrington | |
| 5,910,987 A | | 6/1999 | Ginter et al. | |
| 5,915,019 A | | 6/1999 | Ginter et al. | |
| 5,917,912 A | | 6/1999 | Ginter et al. | |
| 5,918,213 A | * | 6/1999 | Bernard et al. | ................ 705/26 |
| 5,949,876 A | | 9/1999 | Ginter et al. | |
| 5,982,891 A | | 11/1999 | Ginter et al. | |
| 6,185,683 B1 | | 2/2001 | Ginter et al. | |
| 6,314,409 B2 | * | 11/2001 | Schneck et al. | .............. 705/54 |

FOREIGN PATENT DOCUMENTS

| | | | |
|---|---|---|---|
| AU | 9663266 | 9/1996 | |
| EP | 861461 A2 | 9/1998 | |
| JP | 09-138827 | 5/1997 | |
| JP | 10-232918 | 9/1998 | |
| JP | 10-512074 | 11/1998 | |
| JP | 10320470 | 12/1998 | |
| WO | WO 96/27155 | 9/1996 | |
| WO | WO 97/09708 | * 3/1997 | ............ G09G/5/00 |

OTHER PUBLICATIONS

Frentzen, In Need of More Sophisticated Internet Tools, Mar. 28, 1994, PC Week, v11, n12, pN10 (3).*

* cited by examiner

*Primary Examiner*—James P. Trammell
*Assistant Examiner*—Mary Cheung
(74) *Attorney, Agent, or Firm*—Finnegan, Henderson, Farabow, Garrett & Dunner, L.L.P.

(57) ABSTRACT

The invention has the object of offering a method for selling authored work data through data communication means which fulfills the demands of potential buyers to be able to browse and the demands of vendors to be able to prevent copying. In response to a request to download authored work data made from a client to a server through data communication means, a client program is sent from the server to the client for downloading, authored work data and access management information are sent to the client program, and the authored work data is displayed by the client program under the management of the access management information. As a result, a portion of the authored work data is made freely accessible, but restrictions are made to complete disclosure or the preparation of copies.

14 Claims, 3 Drawing Sheets

AUTHORED DATA PROVIDING METHOD, SYSTEM AND COMPUTER-READABLE RECORDING MEDIUM FOR PERFORMING SAID METHOD

CROSS-REFERENCE TO RELATED APPLICATIONS

The present application is a continuation-in-part of International Patent Application No. PCT/JP00/02230 filed Apr. 6, 2000 and designating the United States of America, which claims the priority of Japanese Patent Application No. H11-241404 filed Aug. 27, 1999, the disclosures of both of which are incorporated herein by reference.

BACKGROUND OF THE INVENTION

1. Field of the Invention

The present invention relates to a method for providing authored data such as books, music, movies and the like to users via data communication means, more specifically relates to a method capable of disclosing a portion but restricting disclosure or all of the authored data when providing authored data to a user, or a method which allows disclosure of the authored data but restricts copying or printing thereof. The present invention also relates to software capable of performing such a method, a computer-readable recording medium containing such software and a data communication system including a computer capable of performing such a method.

2. Description of Related Art

With the great advances in data communication technology and installation of data communication networks in recent years, retailers are now able to use means for mutual transmission/reception of data through a plurality of computers connected to data communication means such as the internet to introduce products or services, and customers can also order products or services over the internet. The products or services capable of being provided by these methods are extremely wide-ranging, so that almost all types of products and services can be sold through such data communication means.

As patents relating to electronic commerce performed through data communication means, there are U.S. Pat. No. 5,794,207 of Walker et al. relating to a reverse auction procedure performed between vendors of airline tickets and potential purchasers who wish to purchase airline tickets under certain conditions, U.S. Pat. No. 5,895,454 of Harrington relating to a cart for temporarily storing articles which are to be purchased in on-line shopping, and Japanese Patent Application, First Publication No. Sho 10-320470 of NTT Corp. relating to a method for displaying advertisements correlated with a map. Patents relating to electronic commerce over the internet as typified by these patents are similar in that the products which are to be offered are readily apparent to the buyer. For example, in the case of airline tickets, the product can be almost completely identified by specifying the origin, destination, date and time, and price, and there is usually not much need to go into any further detail.

However, when buying authored works through data communication means, there are problems which are characteristic of such authored works as described below.

That is, taking books as an example, the potential buyer may wish to decide whether or not to buy the book only after having first confirmed whether or not the book contains the information which is sought. Therefore, when purchasing printed books at a bookstore, customers will usually browse through books before deciding on which to buy. Additionally, the portion which a potential buyer will wish to read in order to decide whether the required information is written may differ according to what interests the potential buyer, so that this decision will not always be possible by showing a predetermined portion such as the table of contents.

If in order to respond to such needs for the sales of books using data communication means, the vendor opens the entire contents of a book for browsing by potential buyers through the data communication means, thus enabling the entire contents to be freely viewed, the potential buyer may then read through the entire contents of the book on-line, thus obviating the need to purchase the book. Additionally, the user may copy the entire data onto a local computer for reading at leisure at a later time, in which case the book will likewise not be purchased and put the vendor at a loss. That is, if the content offered by a vendor over the internet is too detailed, the buyer may obtain the information without bothering to pay for it, so that the book will not sell, and making it unprofitable for the vendor.

Due to this problem, when selling books through data communication means, it is often the case that only the cover or table of contents of a book is shown, with the actual content of the book being unviewable. In this case, the potential buyer is forced to decide whether or not to purchase a book without even information which can be obtained by browsing in a bookstore, thus inconveniencing the potential buyer and reducing the advantage of sales through data communication means.

While the above explains the problems with the example of book sales, similar problems exist with regard to sales of music and movies, as well as certificates and public documents issued by government agencies. For example, with regard to the sales of music data, it is advantageous for the purchaser to offer the entire data prior to sales, but this is risky for the vendor, and the risk is much greater if the data is easily copied. On the other hand, if the data which is made available prior to sales is severely limited, this is safe for the vendor but inconvenient for the purchaser. Additionally, in the case of public documents, there are cases where free browsing of a register overall is allowable, but the preparation of copies is charged.

BRIEF SUMMARY OF THE INVENTION

The present invention has the purpose of solving the above-described problems which occur when selling authored data over the internet or the like, and more specifically has the purpose of enabling potential buyers to freely browse desired portions of an authored work for making appropriate judgments as to whether or not to purchase the authored work, while enabling the vendor to prevent the authored work from being taken without payment such as by having all of the data copied, thus balancing the demands of both sides and allowing for trouble-free sales.

Furthermore, according to an embodiment of the present invention, various options can be set according to the needs of the vendor, such as the range of the authored work which is offered freely to the customer, and the conditions whereby browsing and/or copying is restricted.

DETAILED DESCRIPTION OF THE INVENTION

In order to allow the present invention to be more readily understood, the procedures of the present invention and constituents of the present invention shall be explained with reference to an example of a possible embodiment. The embodiment described below is merely an example, and should not be construed as restricting the invention.

Figure 1:
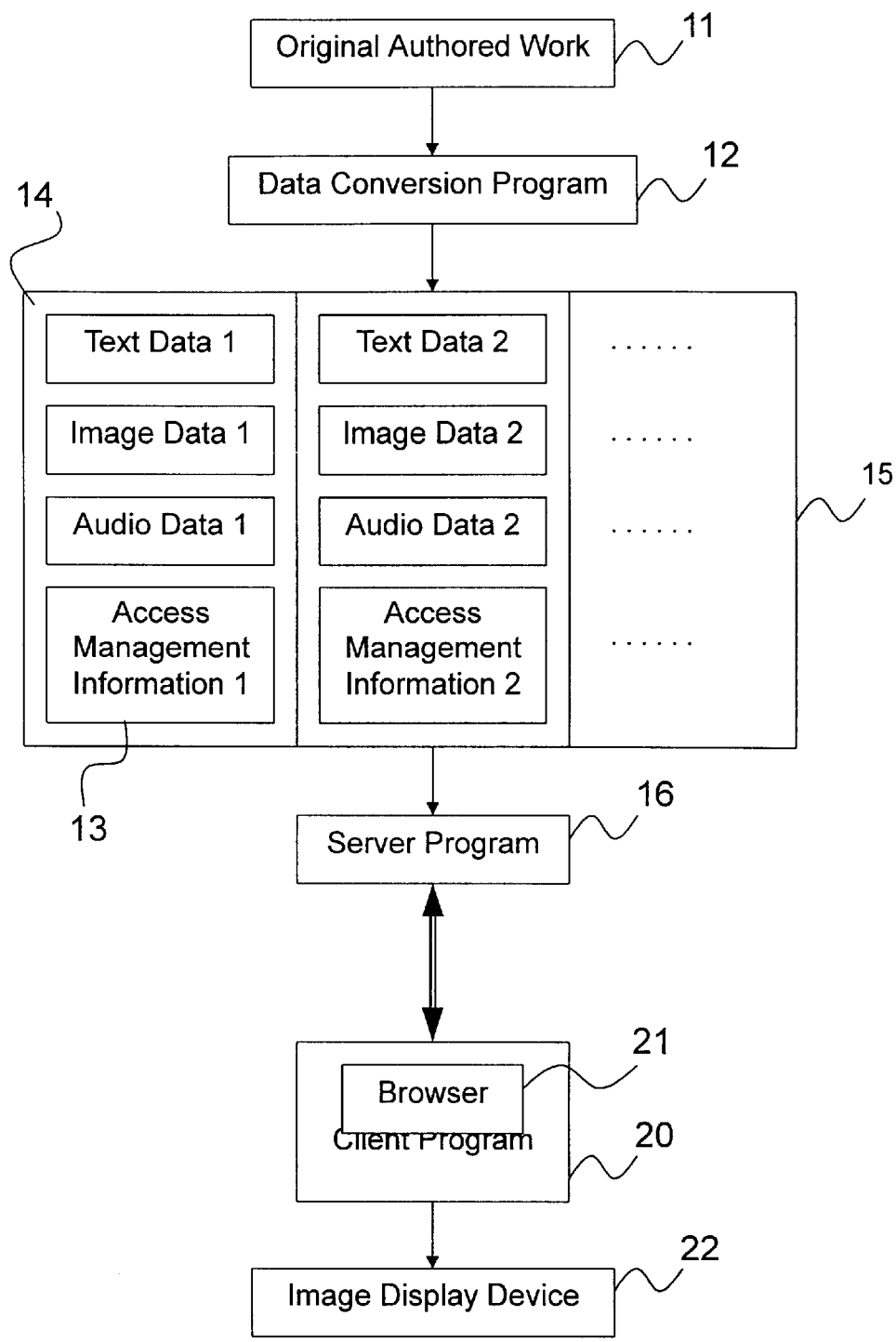
FIG. 1 is an explanatory diagram showing an example of the basic structure of a system to which the present invention is applied.

FIG. 1 is a conceptual diagram showing an example of the structure of a system to which the present invention is applied. Herebelow, authored works shall refer generally to multimedia documents such as text, numerical formulas and drawings, but the present invention shall not be construed as being limited thereto, and all authored works which are capable of being viewed, such as posters, slides, computer-generated graphics, movies and the like are included. Furthermore, the present invention is also applicable to music or other types of audio data, which can be bought after listening to a portion thereof. Additionally, the authored works to which the present invention is applied shall not be limited to those which can be copyrighted, written works, documents, reference materials, video and audio being naturally among such works, but any and all types of information which are capable of being viewed or heard being included.

First, a summary explanation of the processing on the server side shall be given. As shown in FIG. 1, the authored work 11 is converted into digital data by a reading device and conversion program 12 if needed, and stored in an appropriate memory means separated according to its nature, such as whether it is text data, image data or audio data. At this stage, not all of the data is image data and text data is also included. A data set 14 for an authored work is formed by adding access management information 13 to authored work data prepared from the authored work, and a group of data sets 14 prepared for a plurality of authored works 11 form an authored work database 15.

In FIG. 1, the data is held on the server side, but the server side need not be limited to only a server and memory devices associated directly therewith, but includes all locations which are accessible by the server. Therefore, the authored work data may be stored in an external system or memory device, or may be converted from the authored work to data form as the need arises, as long as it is accessible from the server, Here, for convenience of explanation, it shall be assumed that the authored work database 15 is stored in a memory medium connected directly to the server.

Access management information 13 refers to information relating to management and restrictions when offering authored work data from the server to a client, and for example, may include "type of display information (text only, text and images, etc.)", "maximum number of accesses allowed per title per client", "maximum allowed display time for each page", "maximum number of accesses for each page", "maximum allowed number of pages displayed per title per access", and so on.

On the server side, a server program 16 which is capable of accessing the authored work database 15 to read out the data, and connecting with a client-side computer through the internet or the like to perform bidirectional communications is provided. The primary functions of the server program 16 are receiving requests from the client side, sending the client program to the client, checking the validity of the client program, determining whether or not the transmission of authored work data is allowable under the management of the access management information, selecting the necessary data from the authored work database 15, processing images and coding/decoding as needed and sending data including image data to the client.

Next, a summary of the processing on the client side shall be described. The client side is able to transmit and receive the server program 16 and data from the server side via the internet or the like, and further receives the client program 20 which has the functions of decoding, image processing, access management and data display control. At the same time, the server program sends access management information which is necessary for display control to the client.

Thereafter, data relating to the required authored work is received from the server under the control of the server program 16 and the client program 20, images of the authored work are displayed under the management of the access management information, and the display is denied if so required.

The procedures relating to transmission and reception of authored data between the server program 16 and client program 20 shall be explained in detail below.

The client is assumed to have a so-called browser application 21 for transmitting and receiving data over the internet. Thus, when the client sends the server a service request signal by clicking a button on the browser 21, the server sends an initial service screen for the client through the browser, which is then displayed on an image display device 22 of the client. The initial service screen is a screen displaying information such as a list of types of offered services, a list of downloadable authored works and fees for downloading complete authored work data. At this stage, the server has not yet begun access management.

Figure 2:
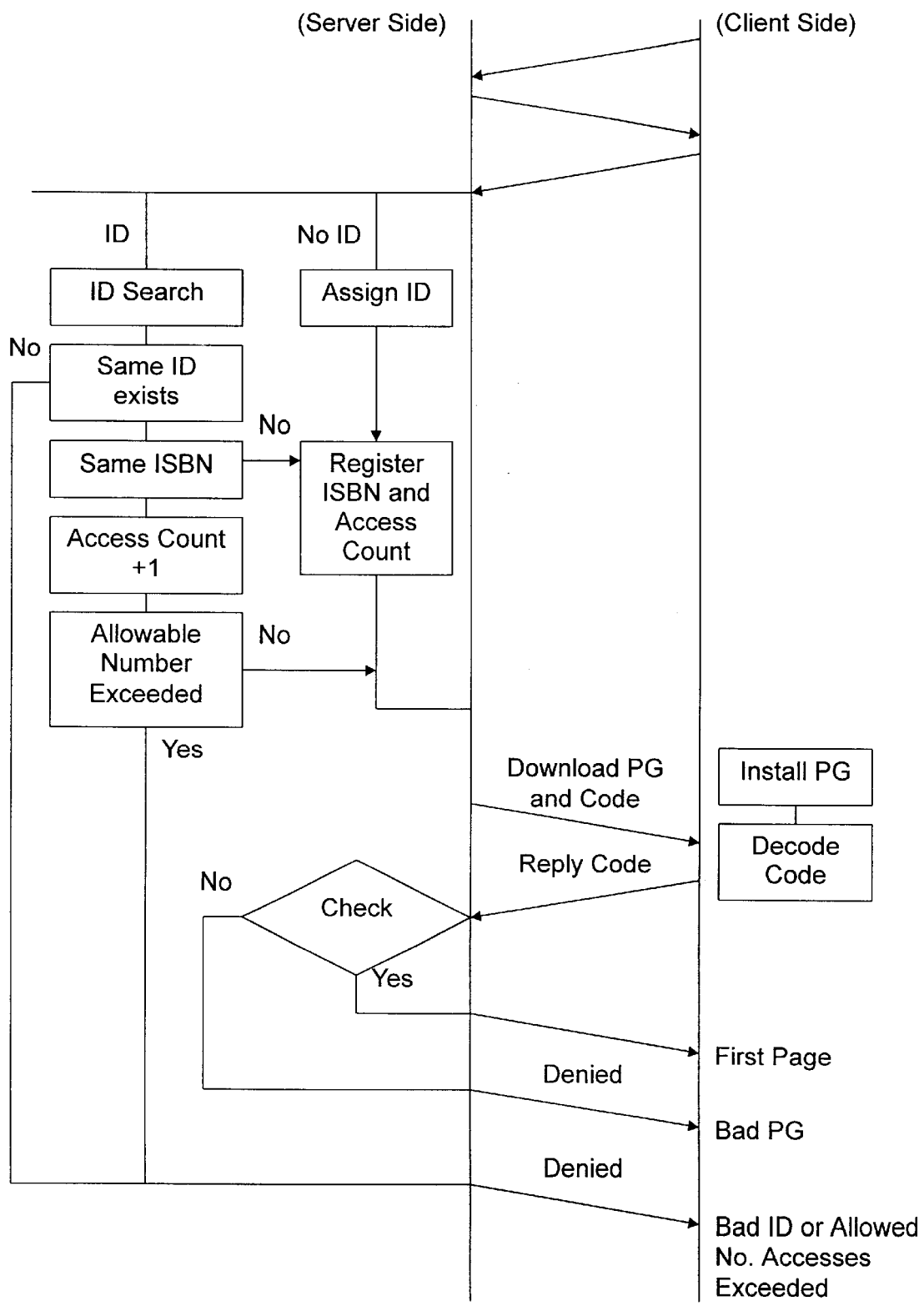
FIG. 2 is a flow chart giving an example of the processing procedures until a first page of "authored data" based on an authored work download request is made from a client to a server.

The client, upon viewing the initial service screen, selects an authored work to request that data be sent. In this case, as shown in the flow chart of FIG. 2, the server program 16 which has received a request to download specific authored work data from the client first determines whether or not an "ID" has already been assigned to the client.

If an ID has not been assigned, a request to input predetermined data is made to the client as needed, and after this has been inputted, if the content fulfills predetermined standards, an ID is assigned to the client, access management corresponding to that ID is begun, and a client program 20 is downloaded to the client. Specifically, the server program 16, upon registering that a first access of an authored work has been requested with that ID, sends the client program 20 along with the coded "access management information" and "valid program confirmation code" to the client for downloading.

However, in a preferred embodiment of the invention, the server program 16, upon receiving a request to download authored work data from a client to which an ID has not been assigned, simply assigns the client an ID without requiring any data input, then goes on to the subsequent procedures. This is because the authored work data which the server program 16 offers to the client at this stage corresponds to that which is browsed at a bookstore, so that download requests should be allowed to be able to be made easily for the sake of convenience.

On the client side, the supplied client program 20 is installed, and a coded "valid program confirmation code" is returned to the server program 16. The server program 16 confirms from the returned "valid program confirmation code" that the client program is valid, and continues access management with respect to an ID for a valid access.

If the download request is from a client which has already been assigned an ID, then the server program 16 determines whether or not the ID is valid. If it is valid, then the procedure advances to the next step, where access management of the requested authored work data is begun. Next, if the authored work is, for example, a book, then the ISBN number is checked to determine whether the book has been accessed before, and whether or not the number of accesses of that book have exceeded the allowable number.

With regard to the procedures subsequent to the initiation of access management, there is basically no difference between download requests from clients which have been assigned an ID for the first time and download requests from clients who have previously been assigned an ID. That is, the server sends access management information (such as the maximum allowable display time for each page (MAX-SEC), the maximum number of accesses allowed for each page (MAX-TIMES), etc.) for each authored work along with the first page of authored work data, codes them and sends them to the client for downloading. At this time, the authored work data, including text data, is all image processed in order to prevent the client from editing the data. This image processing may be performed on either the server side or the client side, but should preferably be performed on the client side for better transmission efficiency (see FIG. 3).

Aside from the above, "access management information" may include the following:

(1) Management of the maximum duration of use and maximum number of displayed pages of the client program (display requests are denied or the screen made blank if the allowable duration or allowable number of pages is exceeded).
(2) Prohibition of data saving functions or printing functions which browsers normally have.
(3) Record of user history (in addition to user checks and code key management, a management number which differs according to the time and date of access as managed on the server side is coded and stored in the client program itself, and data requests made by display programs prepared on the client side without permission are denied).
(4) Display category such as text/image/numbers.
(5) Partial masking of provided information (random display deletion, display of a few lines at a time, numerical formula deleted display, etc.).
(6) Discrimination of managed pages and unmanaged pages (such as excluding the table of contents, cover and blurb from time-based or page-based management).

The access management information may be set for each authored work at the time a download request for the authored work is made from the client side, or may be set as a predetermined value in the client program. Alternatively, a combination of both may be used.

While it is common to display the table of contents as the first page in authored work data, a display procedure which is appropriate to the type of authored work is performed in the case of books such as novels in which a table of contents is not suitable, such as by displaying the first page of the novel, a description or other information. Additionally, the first page of the authored work data can be set so as not to have restrictions as to the maximum allowed display time and maximum number of accesses, i.e. may be designated as a non-managed page. This is especially convenient when, for example, the first page is a table of contents. Furthermore, if the original authored work is a book which is composed of a plurality of pages, it may be formed into links so as to allow the relevant pages to be called up from chapter titles in the table of contents or fro the page number.

Information sent from a server to a client is information corresponding to a single page of images coded with the client ID as the key. The client program 20 is decoded using the ID as a key, forms the image of the page into an image file in JPEG format or the like, with covering data such as the word "SAMPLE" or the like overprinted if needed (the pattern is arbitrary as long as it enables at least a portion of the authored work to be read), and displays the page on the display device 17. The client program 20 performs management such as the "maximum allowable display duration for each page (MAX-SEC)" according to the access management information. Additionally, the image data, once displayed, may be stored, so as to enable it to be reused when the same screen needs to be displayed once again. However, normally, when the connection between the client program and the server program is severed, the client program 20 should preferably completely erase all previously displayed image data which is stored, to minimize situations in which the data is used without the server side's permission.

If a page requested by the client has already been downloaded during the same connection, it is sufficient for the client program 20 to display the stored image data, but if it was downloaded during a connection which has already ended, the serer program performs the transmission procedure after confirmation that the current download request is within the "maximum allowable number of accesses for each page (MAX-TIMES). Of course, within the client program 20, the maximum allowable number of accesses to a single screen for each connection, or the maximum number of accesses of a single screen regardless of whether or not it is the same connection may be set.

In the case of the present embodiment, the server program 16 codes data stored as text data, numerical formulas, images and video, and sends them to the client program 20. The client program 20 converts the text along with the numerical formulas, images, photos and the like to form a single page of image data. This is to reduce the possibility of the authored work data being copied or modified against the will of the server side. The process of forming the text data into images may be performed on the server side prior to data transmission, or performed on the client side after transmission. Whereas it is better to perform image processing in the client program when considering the transmission efficiency, it is better to perform image processing on the server side when considering security. Additionally, the data sent from the server program 16 to the client program 20 does not need to be restricted to a single page, and if appropriate, it is possible to send data corresponding to a plurality of pages at once.

The display of the above-described authored work data is performed by the client program popping up its own window from the browser 21 or the initial screen. At this time, the client program prohibits the use of functions such as copying, transfer, printing and the like which are normally incorporated into browsers. As a result, the risk of the authored work data downloaded to the client being copied against the intentions of the server side can be further reduced. The instructions capable of being made on the client side may be set, for example, to a button (e.g. labeled "Contents") which is pressed to show the content whose viewing is controlled, a button (e.g. labeled ""Next") which is pressed to show the next page or the next screen, a button (e.g. labeled "Previous") which is pressed to show the previous page, and a window close button. Additionally, the pages which are downloaded can be temporarily stored on the client side computer, and used when the next page needs to be displayed during the same session of the client program.

Figure 3:
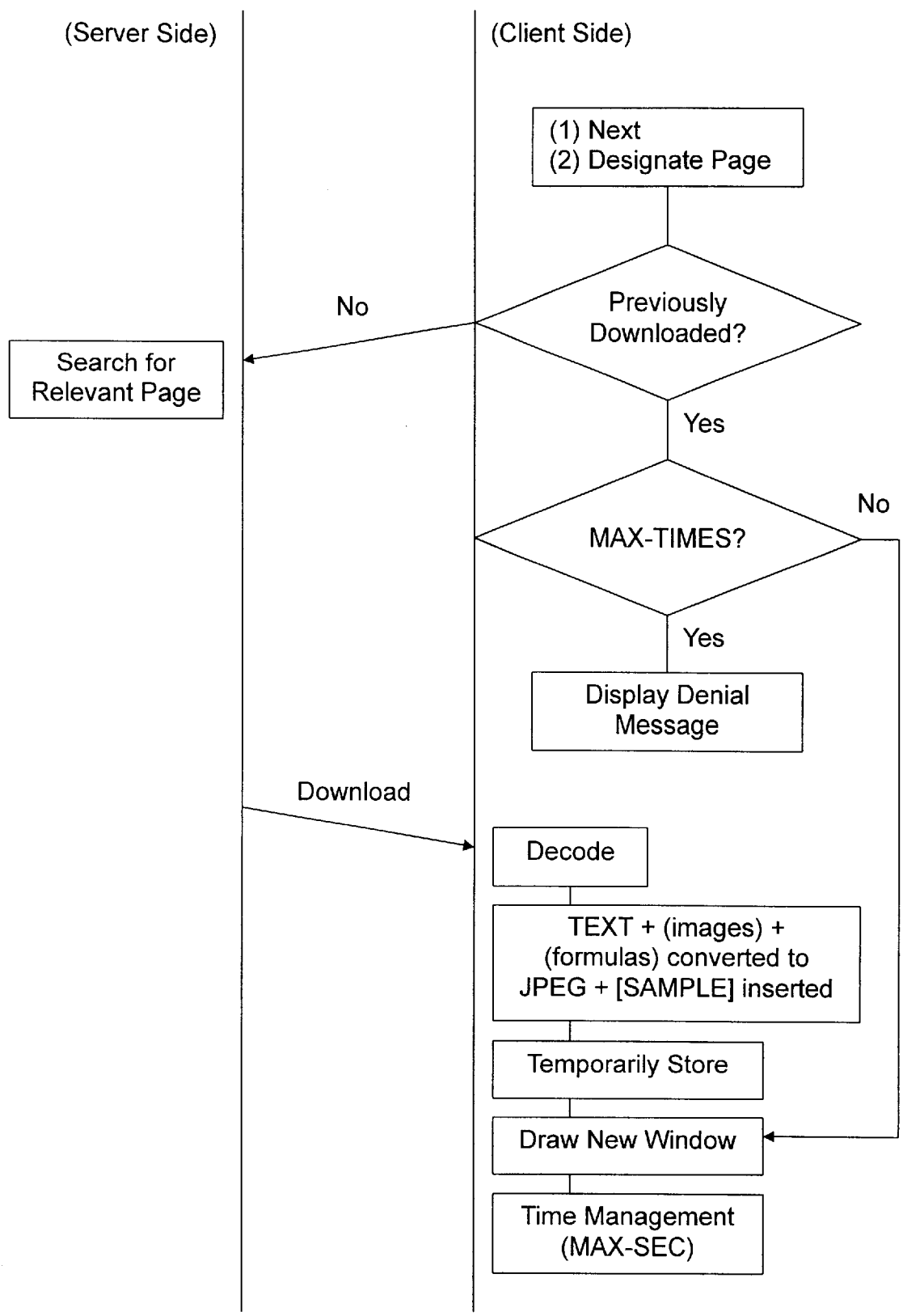
FIG. 3 is a flow chart giving an example of the procedure when the second and subsequent pages of the "authored data" which are controlled are requested.

FIG. 3 is a diagram explaining the processing procedure for when there is a request from the client side to view one of the controlled pages after the first page. On the client side, either the function "Next" which requests the page following the currently shown page, or the function "Designate Page" which requests a certain page is selected. When there is a request, the server checks to confirm that the requested page has not yet been downloaded, then searches for the page in the authored work database 13, codes the retrieved page, and downloads it.

The client program 20 manages the display using "access management information" either received from the server, or suitably updated according to the progress of the processing at the client. For example, the following may be performed.
(1) Temporary storage of downloaded data (temporarily downloaded in the pre-decoded state which it is on downloading, indexed by page number or the like).
(2) Management of the number of accesses and maximum number of accesses (the number of times a certain page is accessed is counted, and once the maximum number is reached, further display is denied).
(3) Management of the display time and maximum display time (the time is measured by seconds since the display of the file with the currently displayed flag began. Once the maximum display time is reached, further access is denied, a message is displayed to that effect, and a screen deletion operation is begun. The display time is the time from when display begins until the "Next" or "Previous" buttons are pushed, and is not the overall browsing time which has elapsed since the program was opened.

Furthermore, if the client side does not take any new actions even after the predetermined display time has passed, then the image display device 22 can be turned off or the like.

In this embodiment, text is stored as text data at the server side, but the text data may first be formed into images and then stored as image data at the server side. In the case of the former, space can be saved on the memory medium, but in the case of the latter, the processing speed for sending the necessary images to the client can be made faster.

The above-described embodiment was described basically for the provision of book data, but the basic flow for music and movie data is the same. However, the display content of the first page which corresponds to the table of content, in the case of music may be such as to display portions such as the track numbers, song titles or lyrics in words. When offering movie data, the content may be similar to a table of contents such as by showing the various parts of the screenplay, or alternatively, representative static images can be displayed as a replacement. Additionally, in the case of a book, data are sent from the server to the client in units of a single page or a number of pages, but in the case of music or move data, a certain amount of time's worth of data is sent.

Due to this structure, the client first receives authored work information such as a table of contents which is usually not controlled by "access restrictions", to obtain an idea of the content, after which the authored work data subsequent to the first page can be requested. Thereafter, the image information of the relevant page is sent to the client together with blinding information and in coded form, under the management of "access restrictions" by the server. Thus, by appropriately setting the content of the access management data, the pages desired by the client can be freely browsed until a predetermined maximum value for browsing time or number of browsed pages is reached, upon which further transmission of the authored work data is denied, thus enabling standard restrictions to be set.

Additionally, the present invention is such that a client program provided from the server side upon request from the client side is installed on the client side, a "valid program confirmation code" is sent back to the server program, the "valid program confirmation code" is checked at the server, and the management of "access restrictions" is begun only with respect to clients which are found to be truly valid. Consequently, it is possible to prevent authored work data from being downloaded using illicitly copied client programs.

Furthermore, the server program can prohibit or turn off the copying, printing and transfer functions which are provided in common browsers, thus allowing authored work data to be prevented from being copied against the intention of the server side.

That is, when selling authored work data through communication means according to the method of the present invention, potential buyers of the authored work data are allowed to check desired pages, thus fulfilling the demand of consumers to be allowed to browse, while also preventing the data from being copied against the intentions of the data provider, thus fulfilling the data providers' need to have a measure of protection against illegal copying which could result in lost profits.

When a client program is transmitted from the server side to the client, the client can continue to store this even after the connection has been severed, and use it at the time of the next connection. However, in the preferred embodiment of the present invention, when a connection ending order is outputted from the client, the client deletes the client program and authored work data received from the server, thereby further reducing the possibility of illegal use of the authored work data. In this case, when a connection is restarted after having connected before, the client program is once again sent from the server to the client for downloading as in the first connection.

What is claimed is:
1. A method for providing authored work data comprising the steps of:
responding to a request to download authored work data made from a client to a server through data communication means;
sending a client program from the server to the client by downloading the client program if the client is not registered;
sending authored work data and access management information to the client program, wherein the client program is installed on the client, the client program being independent of the authored work data and the access management information, and is utilized to access the authored work data through the access management information;
displaying the authored work data with the client program under the management of the access management information;
coding and sending a valid program confirmation code from the server to the client program;
decoding the valid program confirmation code sent from the server with the client program and sending a reply back to the server; and checking the validity of the client program in the server, according to the reply received from the client, and if the client program is valid, responding to download requests and allowing the client program to provide access to the authored work data.

2. The method for providing authored work data in accordance with claim 1, further comprising prohibiting predetermined functions of a browser program with the client program.

3. The method for providing authored work data in accordance with claim 1, further comprising converting the authored work data sent from the server to the client to image data.

4. The method for providing authored work data in accordance with claim 1, wherein sending the authored work data from the server to the client includes using the client program to convert authored work data to image data.

5. The method for providing authored work data in accordance with claim 1, wherein sending the authored work data from the server to the client includes encoding the authored work data.

6. The method for providing authored work data in accordance with claim 1, further comprising blinding a portion of a data by means of blinding data when the client displays the authored work data.

7. The method for providing authored work data in accordance with claim 1, wherein displaying the authored work data with the client program includes using the access management information, which includes at least one of a maximum allowable number of accesses for each title, a maximum allowable display time for each page, a maximum allowable number of accesses for each page, and a maximum number of allowable pages per access per title, and displaying the authored work data when an access fulfills the conditions of the access management information.

8. The method for providing authored work data in accordance with claim 1, wherein sending the authored work data comprises sending multimedia data including at least one or a combination of books, documents, paintings, photos, audio, music, and video.

9. The method for providing authored work data in accordance with claim 1, further comprising using the client program to delete received authored work data and the client program received from the server prior to ending a connection with the server.

10. A system for providing authored work data comprising:
  a server having access to authored work data; and
  a client computer connected with the server via data communication means, for sending requests to download authored work data, receiving the authored work data, and displaying the authored work data on an image display device, wherein in response to a request to download authored work data made from the client to the server through the data communication means a client program is sent from the server to the client for downloading if the client is not registered;
  authored work data and access management information are sent to the client program, wherein the client program is installed on the client computer, the client program being independent of the authored work data and the access management information, and is utilized to access the authored work data through the access management information,
  the authored work data is displayed by the client program under the management of the access management information,
  the server codes and sends a valid program confirmation code to the client program,
  the client program decodes the valid program confirmation code sent from the server and sends a reply back to the server, and
  the server checks the validity of the client program according to the reply received from the client, and if the client program is valid, responds to download requests and allows the client program to provide access to the authored work data.

11. A computer-readable medium containing a server program, wherein in response to a request to download authored work data made from client to the server through a data communication means computer-executable instructions perform steps, comprising;
  sending a client program from the server to the client by downloading the client program if the client is not registered;
  sending authored work data and access management information to the client program, wherein the client program is installed on the client, the client program being independent of the authored work data and the access management information, and is utilized to access the authored work data through the access management information;
  coding and sending a valid program confirmation code to the client program from the server;
  receiving a reply from the client program at the server, after the client program decodes the valid program confirmation code;
  checking the validity of the client program according to the reply received from the client, if the client program is valid, responding to download requests and allowing the client program to provide access to the authored work data.

12. The computer-readable medium of claim 11 having further computer-executable instruction for performing the step of sending the authored work data to the client program after the authored work data is converted to image data.

13. A computer-readable medium containing a client program, which when requesting to download authored work data through data communication means from a server executes computer-executable instructions performing steps comprising:
  receiving an encoded valid program confirmation code from the server;
  decoding the valid program confirmation code sent from the server and sending a reply back to the server, which checks the validity of the client program and responds to download requests if the client program is valid;
  receiving authored work data and access management information sent from the server and accessing the authored work data through the access management information using the client program, the client program being installed on the medium independent of the authored work data and the access management information; and
  displaying the authored work data under the management of the access management information.

14. The computer-readable medium of claim 13 having further computer-executable instruction for performing the step of displaying the authored work data after converting the authored work data to image data.

* * * * *